(12) United States Patent
Huang et al.

(10) Patent No.: US 8,451,602 B2
(45) Date of Patent: May 28, 2013

(54) HANDHELD ELECTRONIC DEVICE

(75) Inventors: Ming-Shuo Huang, Taipei (TW); Chi-Cheng Liao, Taipei (TW); Cheng-Yu Lin, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 311 days.

(21) Appl. No.: 12/651,995

(22) Filed: Jan. 4, 2010

(65) Prior Publication Data

US 2010/0182739 A1    Jul. 22, 2010

(30) Foreign Application Priority Data

Jan. 22, 2009  (TW) ............................... 98102572 A

(51) Int. Cl.
*G06F 1/16* (2006.01)
*G06F 3/02* (2006.01)
*H04M 1/00* (2006.01)

(52) U.S. Cl.
USPC ............ 361/679.56; 361/679.55; 361/679.26; 361/679.3; 455/575.1; 455/575.4; 345/168; 345/169; 345/905

(58) Field of Classification Search
USPC ............ 455/575.1, 575.4, 575.8, 550.1, 90.3; 361/679.01–679.45, 679.55–679.59; 345/156, 345/157, 168, 169, 905
See application file for complete search history.

(56) References Cited

U.S. PATENT DOCUMENTS

| | | | |
|---|---|---|---|
| 5,335,274 A | 8/1994 | Masuda et al. | |
| 6,483,445 B1 * | 11/2002 | England | 341/22 |
| 6,748,249 B1 | 6/2004 | Eromaki et al. | |
| 7,395,102 B2 | 7/2008 | Park et al. | |
| 7,996,052 B2 * | 8/2011 | Shih et al. | 455/575.4 |
| 2007/0123322 A1 * | 5/2007 | Mizushina | 455/575.1 |
| 2007/0270180 A1 | 11/2007 | Takagi | |
| 2008/0139260 A1 | 6/2008 | Kauhaniemi et al. | |
| 2008/0297991 A1 * | 12/2008 | Ou | 361/679 |
| 2009/0086425 A1 * | 4/2009 | Lai et al. | 361/679.56 |
| 2010/0144409 A1 * | 6/2010 | Huang et al. | 455/575.4 |
| 2011/0003622 A1 * | 1/2011 | Hwang | 455/575.1 |
| 2011/0136551 A1 * | 6/2011 | Wong et al. | 455/575.1 |

FOREIGN PATENT DOCUMENTS

CN    101460032    6/2009

OTHER PUBLICATIONS

"First Office Action of China Counterpart Application", issued on Feb. 17, 2011, p. 1-p. 4, in which the listed reference was cited.

* cited by examiner

*Primary Examiner* — Jayprakash N Gandhi
*Assistant Examiner* — Nidhi Desai
(74) *Attorney, Agent, or Firm* — Jianq Chyun IP Office

(57) ABSTRACT

A handheld electronic device includes a first body, a second body, a flexible electrical connector, and a protection cover. The second body is slidably stacked with the first body. The flexible electrical connector is electrically connected between the first body and the second body. The cover is slidably disposed between the first body and the second body. The cover is at an initial position when the first body and the second body are in a stacked state. The cover shields the flexible electrical connector exposed after the second body moves when the first body and the second body are in a spread state. As a result, the lifetime of the handheld electronic device can be prolonged. Additionally, the available region of the handheld electronic device in the spread state can be increased to provide higher design flexibility.

9 Claims, 5 Drawing Sheets

HANDHELD ELECTRONIC DEVICE

CROSS-REFERENCE TO RELATED APPLICATION

This application claims the priority benefit of Taiwan application serial no. 98102572, filed on Jan. 22, 2009. The entirety of the above-mentioned patent application is hereby incorporated by reference herein and made a part of specification.

BACKGROUND OF THE INVENTION

1. Field of the Invention

The invention relates to a handheld electronic device and more particularly, to a handheld electronic device protecting a flexible electrical connector connected between two stacked bodies via a protection cover.

2. Description of the Related Art

A handheld electronic device is an electronic device that a user can hold and operate, and the electronic device is small and light to be convenient for the user to take. For example, a common handheld electronic device may be a mobile phone, a multimedia player, a personal digital assistant (PDA), a pocket computer, a portable game console, and a potable global positioning system (GPS).

Nowadays, a slide-type handheld electronic device is a common design. The slide-type handheld electronic device mainly includes two bodies having a display interface and an input interface, respectively. The two bodies can slides relative to each other to present a stacked state or a spread state. Additionally, the slide-type handheld electronic device further includes a flexible printed circuit (FPC) used for connecting the two bodies having the display interface and the input interface.

However, in the slide-type handheld electronic device, since the FPC is connected between the two bodies, after the slide-type handheld electronic device is spread, the FPC may be exposed. Particularly, when the user wants to further improve a spread degree of the two bodies (a stacked region of the two bodies is decreased), the FPC is certainly exposed. Thus, an appearance of the handheld electronic device is affected, and the FPC may be damaged under an external force.

BRIEF SUMMARY OF THE INVENTION

The invention provides a handheld electronic device which can accurately control a sliding distance of a protection cover to make the protection cover not interfere with other components in the handheld electronic device and provide longer lifetime.

To describe the invention specifically, the invention provides a handheld electronic device including a first body, a second body, a flexible electrical connector, and a protection cover assembly. The first body has a fixing part. The second body has a frame. The frame has an opening and is slidably disposed on the fixing part. Additionally, an exposed end of the frame slides outside the first body along an operation direction to make the state of the first body and the second body converted from a stacked state to a spread state to expose the opening. The flexible electrical connector passes through the opening of the frame to be electrically connected between the first body and the second body. The protection cover assembly is disposed close to the opening. The protection cover assembly includes a protection cover slidably disposed on the frame. The protection cover and the exposed end of the frame are disposed at a same side of the flexible electrical connector. The protection cover has a blocking part disposed at a side facing the fixing part. When the first body and the second body are in the stacked state, the protection cover is at a first position of the frame. When the frame moves along the operation direction, the fixing part interferes with the blocking part of the protection cover to drive the protection cover to move from the first position of the frame to a second position of the frame to shield the opening exposed after the frame moves, and then the first body and the second body are in the spread state.

In an embodiment of the invention, the protection cover assembly further includes a guidance part and a first elastic member. The guidance part is fixed on the frame. The protection cover is slidably disposed on the guidance part. Additionally, the first elastic member is connected the protection cover and the guidance part.

In an embodiment of the invention, the first elastic member includes a helical spring.

In an embodiment of the invention, the blocking part of the protection cover is formed by bending an edge part of the protection cover.

In an embodiment of the invention, the flexible electrical connector includes a FPC.

In an embodiment of the invention, the fixing part contracts by a predetermined distance inward at a side facing the blocking part of the protection cover to adjust a stroke of the protection cover moving from the first position to the second position.

In an embodiment of the invention, the handheld electronic device further includes a second elastic member connected with the frame and the fixing part.

In an embodiment of the invention, the second elastic member includes at least a coil spring.

In an embodiment of the invention, the first body includes an input interface.

In an embodiment of the invention, the second body includes a display interface.

As stated above, in the invention, a protection cover assembly is disposed between the first body and the second body. When the first body and the second body is in the spread state, via interference between the protection cover and the fixing part of the first body, relative displacement is produced between the protection cover and the second body to shield the opening of the frame of the second body and the flexible electrical connector in the opening.

These and other features, aspects and advantages of the present invention will become better understood with regard to the following description, appended claims, and accompanying drawings.

DETAILED DESCRIPTION OF THE EMBODIMENTS

The invention utilizes a combination of a protection cover and a sliding mechanism to allow two bodies of the handheld electronic device to move relative to each other and a flexible electrical connector electrically connected between the two bodies to be protected by the protection cover after two bodies of the handheld electronic device is in a spread state. Then, the lifetime of the handheld electronic device is prolonged. On the other hand, the protection cover design of the invention helps to increase an available region of the slide-type handheld electronic device in the spread state to provide higher design flexibility. The available region may be a region of keys exposed after the two bodies spread.

The handheld electronic device of the invention may be a mobile phone, a multimedia player, a PDA, a pocket computer, a portable game console, and a potable GPS. The mobile phone is taken as an example in following embodiments to explain the invention.

Figure 1A:
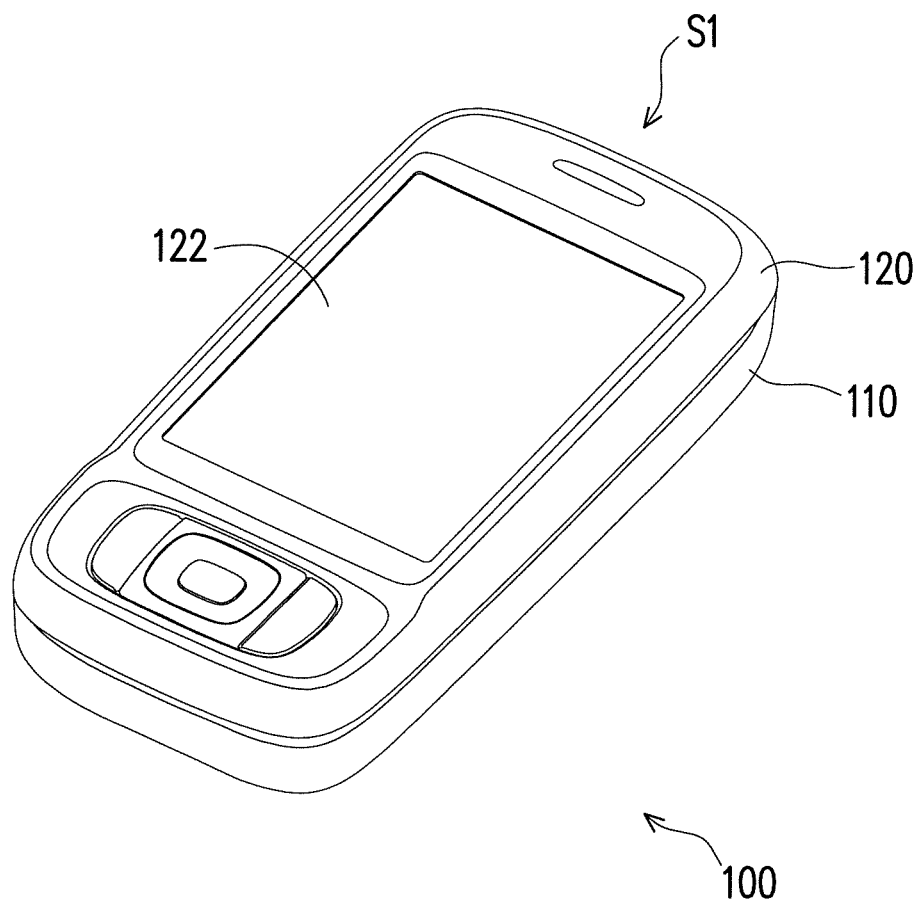
FIG. 1A and FIG. 1B are schematic diagrams showing operations of a handheld electronic device according to an embodiment of the invention.
Figure 1B:
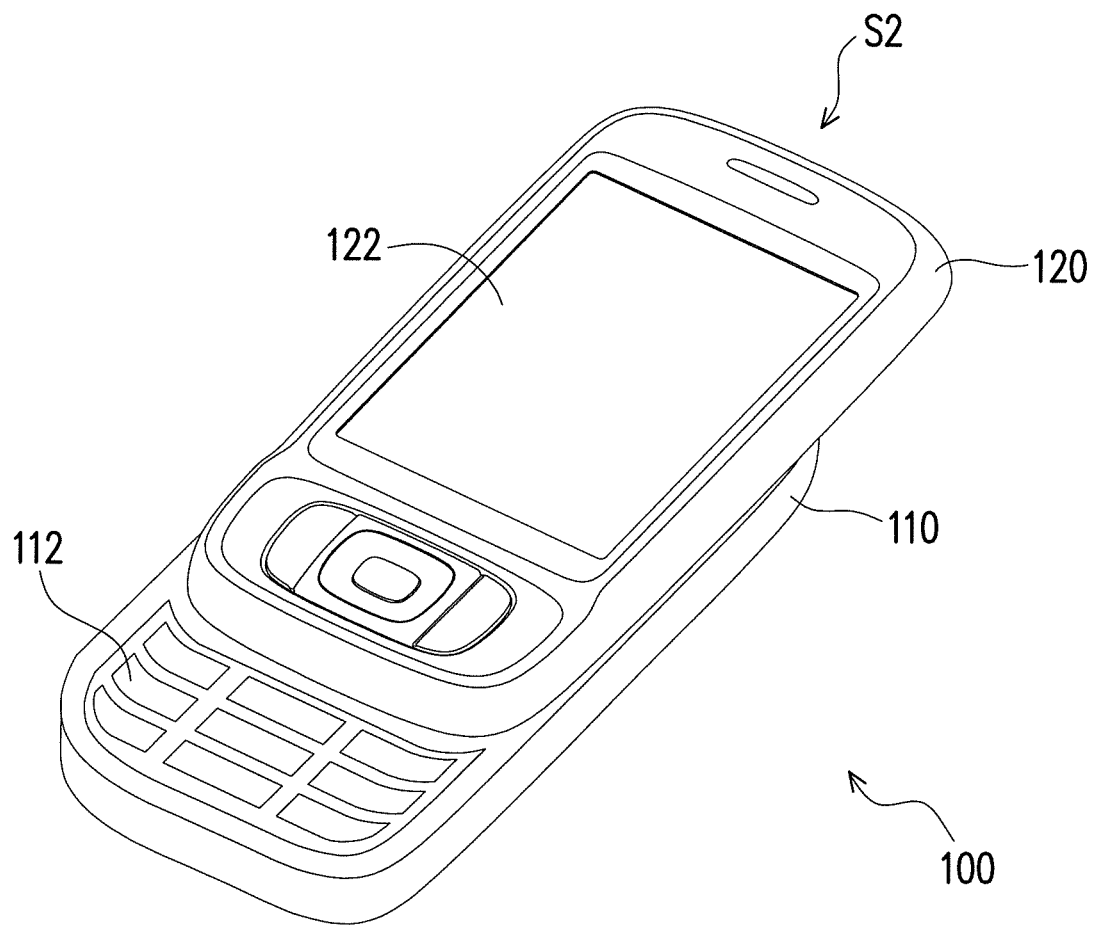

FIG. 1A and FIG. 1B are schematic diagrams showing operations of a handheld electronic device according to an embodiment of the invention. A handheld electronic device 100 may be a mobile phone including a first body 110 and a second body 120. The second body 120 may be movably disposed on the first body 110 to move relative to the first body 110. In this embodiment, the first body 110 has an input interface 112 such as a keyboard. The second body 120 has a display interface 122 such as a display screen.

The second body 120 can move relative to the first body 110 between a stacked position S1 as shown in FIG. 1A and a spread position S2 as shown in FIG. 1B. When the second body 120 slides to the stacked position as shown in FIG. 1A, the handheld electronic device 100 is in a stacked state. At the time, the input interface 112 of the first body 110 is shielded by the second body 120. Additionally, when the second body 120 slides to the spread position as shown in FIG. 1B, the handheld electronic device 100 is in the spread state, the input interface 112 the second body 120 is not shielded any more, a user can use the handheld electronic device 100 via the input interface 112 and the display interface 122.

In the invention, a protection cover is combined to the sliding mechanism of the handheld electronic device 100 to provide perfect protection and shield effects to components (such as a flexible electrical connector) which may be exposed in an operation process of the handheld electronic device 100 to prolong the lifetime of the handheld electronic device.

Figure 2A:
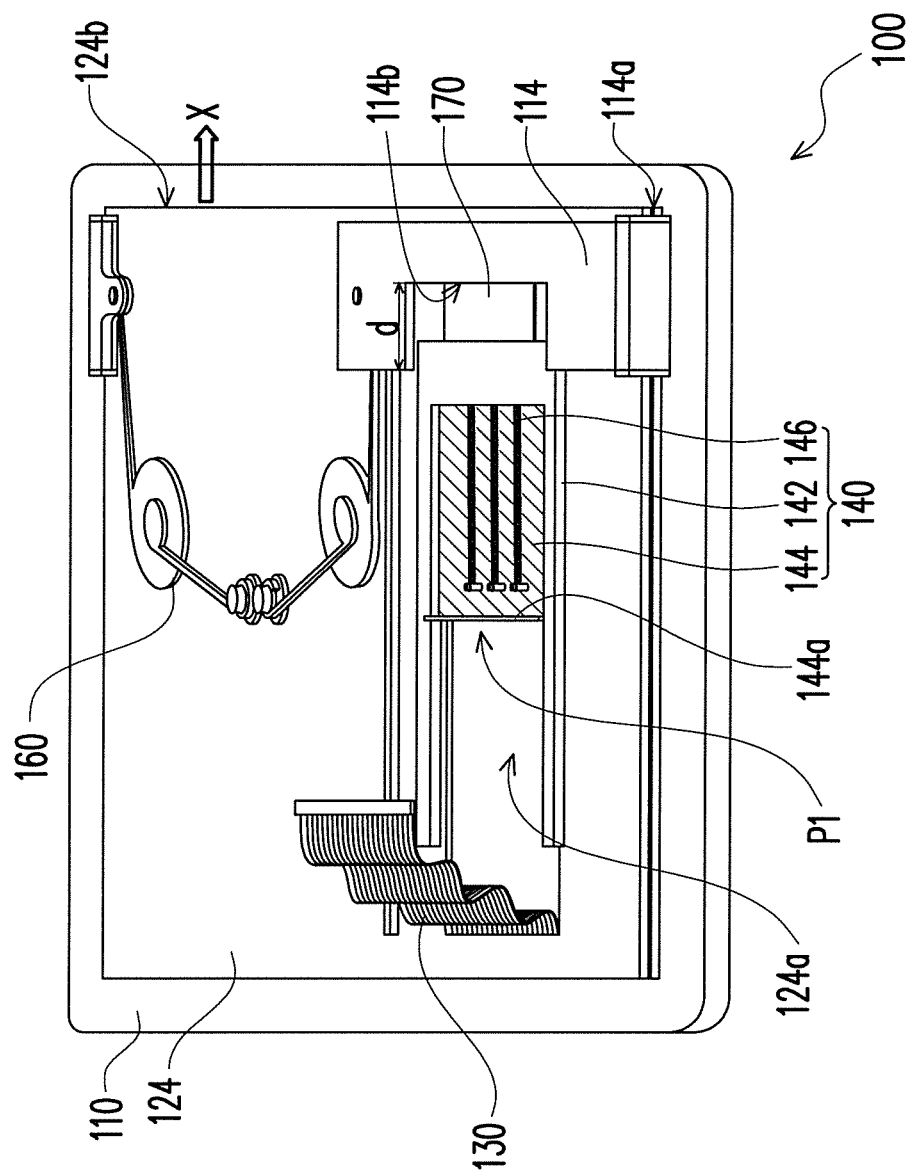
FIG. 2A to FIG. 2C are schematic diagrams orderly showing action process of the handheld electronic device moving from a stacked position to a spread position.
Figure 2B:
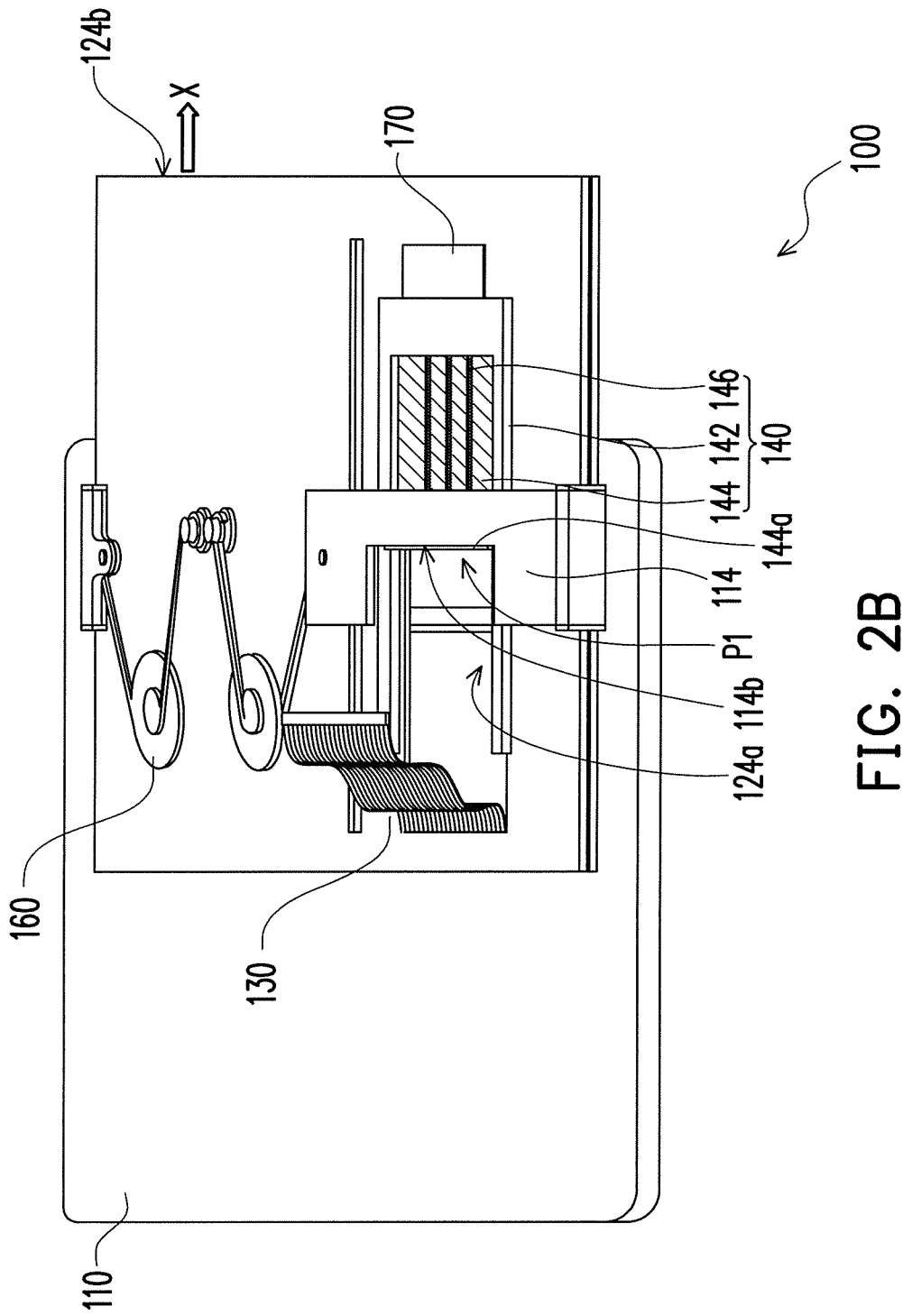
Figure 2C:
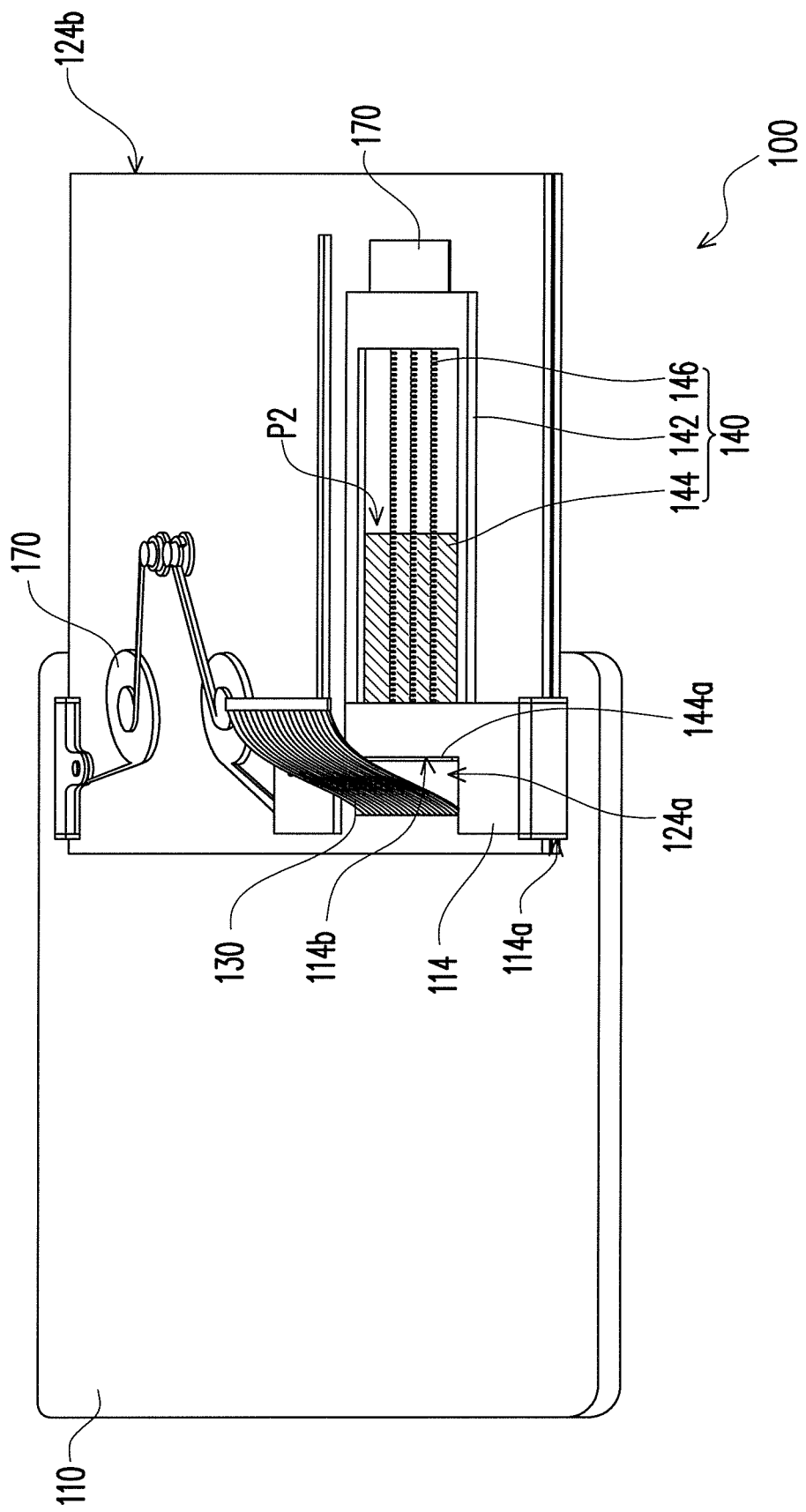

A detailed structure of the handheld electronic device 100 is described hereafter accompanying FIG. 2A to FIG. 2C. For a concise description, similar component numbers denote similar components in FIG. 1A and FIG. 1B.

FIG. 2A to FIG. 2C are schematic diagrams orderly showing action process of the handheld electronic device 100 in FIG. 1A moving from a stacked position to a spread position. To clearly show the relationship between components, part of the second body 120 is omitted in FIG. 2A to FIG. 2C.

As shown in FIG. 2A to FIG. 2C, a fixing part 114 is disposed at a side of the first body 110 of the handheld electronic device 100, and the side faces the second body 120. In this embodiment, a runner 114a may be disposed at the fixing part 114. The second body 120 (not shown in FIG. 2A to FIG. 2C, but shown in FIG. 1A and FIG. 1B) has a frame 124. The frame 124 is slidably disposed at the runner 114a of the fixing part 114, and it is adapted for driving the second body 120 to slide relative to the first body 110 along an operation direction X to allow the stacked two bodies to be gradually detached from each other. Detailedly speaking, the state of the first body 110 and the second body 120 can be converted from the stacked state as shown in FIG. 2A to the spread state as shown in FIG. 2C via a state as shown in FIG. 2B to make the input interface 112 of the first body 110 unshielded by the second body 120 and provided for the user to use.

In this embodiment, a second elastic member 160 is disposed between the first body 110 and the second body 120. The second elastic member 160 is connected with the frame 124 of the second body 120 and the fixing part 114 of the first body 110. The second elastic member 160 may be composed of a coil spring or other types of springs to allow the first body 110 and the second body 120 to operate automatically, semi-automatically, or manually.

The handheld electronic device 100 further includes a flexible electrical connector 130 passing through the opening 124a of the frame 124 to be electrically connected between the first body 110 and the second body 120. In this embodiment, the flexible electrical connector 130 may be a FPC. Detailedly speaking, the flexible electrical connector 130 may be electrically connected between a control circuit (not shown) of the first body 110 and the display interface 122 of the second body 120. When the state of the first body 110 and the second body 120 is converted from the stacked state as shown in FIG. 2A to the spread state as shown in FIG. 2C, an exposed end 124b of the frame 124 slides outside the first body 110 along the operation direction X, the opening 124a formed on the frame 124 and the flexible electrical connector 130 therein are also outside the first body 110.

To shield the flexible electrical connector 130 which may be exposed after the first body 110 and the second body 120 spread, a protection cover assembly 140 is disposed between the first body 110 and the second body 120. The protection cover assembly 140 is on the frame 124. The protection cover assembly 140 includes a guidance part 142, a protection cover 144, and a first elastic member 146. The guidance part 142 is fixed on the frame 124. The protection cover 144 is slidably disposed on the guidance part 142. The protection cover 144 and the exposed end 124b of the frame 124 are at a same side of the flexible electrical connector 130. The protection cover 144 has a blocking part 144a at a side facing the fixing part 114. Additionally, the first elastic member 146 is connected with the protection cover 144 and the guidance part 142 to provide resilience with which the protection cover 144 moves on the guidance part 142.

In this embodiment, the blocking part 144a of the protection cover 144 may be formed by bending an edge part of the protection cover 144. Additionally, the first elastic member 146 includes helical springs 146a connected between the protection cover 144 and the guidance part 142, respectively.

When the first body 110 and the second body 120 are in the stacked state as shown in FIG. 2A, the protection cover 144 is at a first position P1 of the frame 124. When the frame 124 moves along the operation direction X, the fixing part 114 interferes with the blocking part 144a of the protection cover 144 as shown in FIG. 2B to make the protection cover 144 move from the first position P1 of the frame 124 as shown in FIG. 2B to a second position P2 of the frame 124 as shown in FIG. 2C. At the time, the first elastic member 146 is pulled to store the resilience, and the protection cover 144 shields the opening 124a exposed after the frame 124 moves until the first body 110 and the second body 120 are in the spread state.

Certainly, the operation process shown in FIG. 2A to FIG. 2C may be reversible. In other words, if the steps are reversely performed, that is, the steps in FIG. 2C to 2A is performed orderly, the state of the handheld electronic device 100 can be converted from the spread state to the stacked state. In the process of FIG. 2C to 2A, due to the resilience restored by the first elastic member 146, the protection cover 144 and the fixing part 114 still keep contact. Thus, the opening 124a of the frame 124 and the flexible electrical connector 130 therein are not exposed. As shown in FIG. 2B, the guidance part 142 contacts the protection cover 144 to push the protection cover 144 away from the fixing part 114 until the first body 110 and the second body 120 are in the stacked state as shown in FIG. 2A.

Furthermore, in this embodiment, the shape of the fixing part 114 of the first body 110 can be changed to control a sliding distance which is a stroke of the protection cover 144. Detailedly speaking, the fixing part 114 in this embodiment contracts by a predetermined distance d inward at a side facing the blocking part 144a of the protection cover 144 to form an indentation 114b. As a result, along with the variation of a side of the fixing part 114 for abutting against the blocking part 144a of the protection cover 144, when the handheld electronic device 100 is in the spread state as shown in FIG. 2C, the second position P2 of the frame 124 that the protection cover 144 is at can be changed. In other words, the stroke of the protection cover 144 which is the distance of moving form the first position of the frame 124 to the second position can be adjusted in the above mode. Furthermore, in this embodiment, via a structural design between the protection cover assembly 140 and the fixing part 114, the position of the protection cover 144 can be controlled in a specific region to make the protection cover 144 not interfere with other electronic components such as an electronic component 170 as shown in FIG. 2A to FIG. 2C of the first body 110 or the second body.

The shapes and locations of the components such as the fixing part 114, the frame 124, the protection cover 144, the blocking part 144a, the first elastic member 146, and the second elastic member 160 in the embodiments are just taken as examples, but not for limiting the invention. In other possible embodiments, as long as the structures can realize the similar effect, they also may be used at the first body 110, the second body 120, and the protection cover assembly 140.

As stated above, the handheld electronic device of the invention has a protection cover design. The protection cover can shield a flexible electrical connector which may be exposed when the handheld electronic device is in the spread state. Thus, the protection cover can provide perfect protection effect for the flexible electrical connector, and it helps to prolong the lifetime of the handheld electronic device and improve the appearance. On the other hand, since the protection cover can provide a shield effect for the flexible electrical connector, a user does not need to worry that the flexible electrical connector is exposed outside duo to the over-spread of handheld electronic device. As a result, not only the available region of the handheld electronic device can be increased, higher design flexibility can be provided. Additionally, the shape of the fixing part of the first body can be changed to control the stroke of the protection cover, and via the structural design between the protection cover assembly and the fixing part, the position of the protection cover can be controlled in a specific region to make the protection cover not interfere with other components of the first body and the second body.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A handheld electronic device, comprising:
   a first body having a fixing part;
   a second body having a frame, wherein the frame has an opening and is slidably disposed at the fixing part; and
   a protection cover assembly, comprises:
      a guide portion, fixed on the frame;
      a protection cover, slidably disposed on the guide portion; and
      a first elastic member, connecting the protection cover and the guide portion;
   when the first body and the second body are in the stacked state, the protection cover is at a first position of the frame, when the frame moves along an operation direction, the fixing part interferes with the protection cover to drive the protection cover to move from the first position of the frame to a second position of the frame and completely shield the opening exposed after the frame moves, and then the first body and the second body are in the spread state.

2. The handheld electronic device according to claim 1, wherein the first elastic member comprises a helical spring.

3. The handheld electronic device according to claim 1, wherein the protection cover has a blocking part disposed at a side facing the fixing part the blocking part of the protection cover is formed by bending an edge part of the protection cover.

4. The handheld electronic device according to claim 3, wherein the fixing part contracts by a predetermined distance inward at a side facing the blocking part of the protection cover to adjust a stroke of the protection cover moving from the first position to the second position.

5. The handheld electronic device according to claim 1, further comprising a flexible electrical connector passing through the opening of the frame to be electrically connected between the first body and the second body, the flexible electrical connector comprises a flexible printed circuit (FPC).

6. The handheld electronic device according to claim 1, further comprising a second elastic member connected with the frame and the fixing part.

7. The handheld electronic device according to claim 6, wherein the second elastic member comprises at least a coil spring.

8. The handheld electronic device according to claim 1, wherein the first body comprises an input interface.

9. The handheld electronic device according to claim 1, wherein the second body comprises a display interface.

* * * * *